(12) United States Patent
Lee et al.

(10) Patent No.: US 8,520,479 B2
(45) Date of Patent: Aug. 27, 2013

(54) OBJECTIVE LENS DRIVING UNIT AND OPTICAL PICKUP DEVICE USING THE SAME

(75) Inventors: Young-bin Lee, Suwon-si (KR); Min-soo Kang, Seoul (KR)

(73) Assignee: Toshiba Samsung Storage Technology Corporation, Suwon-si (KR)

( * ) Notice: Subject to any disclaimer, the term of this patent is extended or adjusted under 35 U.S.C. 154(b) by 0 days.

(21) Appl. No.: 13/365,703

(22) Filed: Feb. 3, 2012

(65) Prior Publication Data
US 2012/0281517 A1    Nov. 8, 2012

(30) Foreign Application Priority Data
May 6, 2011    (KR) .................. 10-2011-0043085

(51) Int. Cl.
*G11B 7/00*    (2006.01)

(52) U.S. Cl.
USPC ...................................... 369/44.14

(58) Field of Classification Search
USPC ........... 369/44.12, 44.11, 44.14, 44.15, 44.21
See application file for complete search history.

(56) References Cited

U.S. PATENT DOCUMENTS

| | | | |
|---|---|---|---|
| 4,991,161 A * | 2/1991 | Ikegame et al. | 369/44.15 |
| 6,724,696 B2 | 4/2004 | Kim et al. | |
| 6,768,601 B2 * | 7/2004 | Ju | 359/824 |
| 6,847,595 B2 * | 1/2005 | Tanaka | 369/44.14 |
| 7,869,313 B2 * | 1/2011 | Kim et al. | 369/44.14 |
| 2003/0072244 A1 * | 4/2003 | Matsui | 369/112.23 |
| 2005/0281147 A1 * | 12/2005 | Kim et al. | 369/44.14 |
| 2006/0146661 A1 * | 7/2006 | Ke et al. | 369/44.14 |
| 2008/0080334 A1 * | 4/2008 | Tadano et al. | 369/44.14 |

FOREIGN PATENT DOCUMENTS

| | | |
|---|---|---|
| JP | 05-314527 A | 11/1993 |
| JP | 2003-228860 | 8/2003 |
| JP | 2004-005822 A | 1/2004 |
| JP | 2007-200510 | 8/2007 |
| KR | 2002-0096296 | 12/2002 |
| KR | 10-2008-0062630 A | 7/2008 |

OTHER PUBLICATIONS

Korean Office Action issued on Mar. 27, 2013 in Korean Patent Application No. 10-2011-0043085. (4 pages in Korean).

* cited by examiner

*Primary Examiner* — Nabil Hindi
(74) *Attorney, Agent, or Firm* — NSIP Law

(57) ABSTRACT

An objective lens driving unit is provided and includes a moving structure having an objective lens and a plurality of driving coils, a permanent magnet and a yoke structure to correspond to the driving coils, a wire holder coupled to the yoke structure and having a plurality of wiring layers buried in a portion of the wire holder, and a plurality of suspension wires to connect the plurality of driving coils to the plurality of wiring layers.

20 Claims, 5 Drawing Sheets

OBJECTIVE LENS DRIVING UNIT AND OPTICAL PICKUP DEVICE USING THE SAME

CROSS-REFERENCE TO RELATED PATENT APPLICATION

This application claims the benefit under 35 U.S.C. § 119(a) of Korean Patent Application No. 10-2011-0043085, filed on May 6, 2011, in the Korean Intellectual Property Office, the disclosure of which is incorporated herein in its entirety by reference for all purposes.

BACKGROUND

1. Field

The following description relates to an objective lens driving unit to cope with electrostatic discharge (ESD) and an optical pickup device using the objective lens driving unit.

2. Description of the Related Art

Generally, an objective lens driving unit of an optical pickup device may be configured with a voice coil motor (VCM) structure. The objective lens driving unit may be configured with a static structure including a permanent magnet and a yoke, and a moving structure including a driving coil and an objective lens. The moving structure may be generally supported by a plurality of suspension wires with respect to the static structure. The suspension wires may have an electrical connection function to apply to the driving coil of the moving structure, and a driving voltage that may be used in lens focusing and tracking control.

An optical pickup device for a slim optical disc drive may be used in a notebook or laptop computer or the like. Often times, the optical pickup device may be exposed to the outside and thus, may be affected by external impurities or electrical impact. In order to stably drive the optical disc drive, a structure capable of coping with electrostatic discharge (ESD) to protect the optical pickup device from external electrical impact may be used.

SUMMARY

In one general aspect, there is provided an objective lens driving unit including a moving structure that may include an objective lens and a plurality of driving coils, a permanent magnet and a yoke structure to correspond to the driving coils, a wire holder that may be coupled to the yoke structure and having a plurality of wiring layers buried in a first surface from among a plurality of side surfaces of the wire holder, and a plurality of suspension wires to connect the plurality of driving coils to the plurality of wiring layers.

A ground wiring layer may be included in the plurality of wiring layers. The objective lens driving unit may further include a protective cover to protect the moving structure and electrically connected to the ground wiring layer.

The objective lens driving unit may further include a fixed portion fixed to the wire holder and disposed on a side of the yoke structure.

The objective lens driving unit may further include a connection portion disposed between the yoke structure and the fixed portion, wherein a side of the protective cover may be fixed to the connection portion.

The fixed portion may be fixed to a second surface of the wire holder adjacent to the first surface of the wire holder.

The ground wiring layer may be located at a center of the first surface of the wire holder and the other wiring layers among the plurality of wiring layers may be located on both sides of the ground wiring layer.

In another general aspect, there is provided an optical pickup device including a moving structure that may include an objective lens and a plurality of driving coils, a static structure that may include a permanent magnet and a yoke structure to correspond to the plurality of driving coils, a wire holder attached to the yoke structure and having a plurality of wiring layers including a ground wiring layer buried in a first surface from among a plurality of surfaces of the wire holder, and a plurality of suspension wires connecting the plurality of driving coils to the plurality of wiring layers, and a base to support the static structure and including a light source and a photodetector disposed therein.

The optical pickup device may further include a protective cover to protect the moving structure and electrically connected to the ground wiring layer.

The optical pickup device may further include a fixed portion fixed to the wire holder and disposed on a side of the yoke structure.

The optical pickup device may further include a connection portion disposed between the yoke structure and the fixed portion, wherein a side of the protective cover may be fixed to the connection portion.

The fixed portion may be fixed to a second surface of the wire holder adjacent to the first surface of the wire holder, wherein the fixed portion fixed to the second surface may be electrically connected to the ground wiring layer through an edge portion between the first surface and the second surface.

The ground wiring layer may be located at a center of the first surface of the wire holder and the other wiring layers among the plurality of wiring layers may be located on both sides of the ground wiring layer.

In another general aspect, there is provided an optical disc drive including a spindle motor to drive an optical disc, and an optical pickup device to correspond to a recording surface of the optical disc, wherein the optical pickup device includes a moving structure that may include an objective lens and a plurality of driving coils, a static structure that may include a permanent magnet and a yoke structure to correspond to the plurality of driving coils, a wire holder attached to the yoke structure and having a plurality of wiring layers that may include a ground wiring layer buried in a first surface from among a plurality of surfaces of the wire holder, and a plurality of suspension wires connecting the plurality of driving coils to the plurality of wiring layers, and a base to support the static structure and including a light source and a photodetector disposed therein.

The ground wiring layer may be located at a center of the first surface of the wire holder and the other wiring layers among the plurality of wiring layers may be located on both sides of the ground wiring layer.

In another general aspect, there is provided an objective lens driving unit including a first structure including an objective lens and a plurality of driving coils, a second structure including a permanent magnet and a yoke structure to correspond to the driving coils, a wire holder coupled to the yoke structure and having a plurality of wiring layers integrally formed in a portion of the wire holder, and a plurality of suspension wires to connect the plurality of driving coils to the plurality of wiring layers.

In another general aspect, there is provided an optical apparatus including a housing assembly including an optical pickup device including an objective lens driving unit used in the optical pickup device, the objective lens driving unit including a first structure including an objective lens and a plurality of driving coils, a second structure including a permanent magnet and a yoke structure to correspond to the driving coils, a wire holder coupled to the yoke structure and having a plurality of wiring layers buried in a portion of the wire holder, and a plurality of suspension wires to connect the plurality of driving coils to the plurality of wiring layers.

The housing assembly may include a plurality of beam splitters, a plurality of light sources, and a photodetector.

The wire holder may be integrally formed to a rear surface of the wire holder.

Other features and aspects may be apparent from the following detailed description, the drawings, and the claims.

Figure 1:
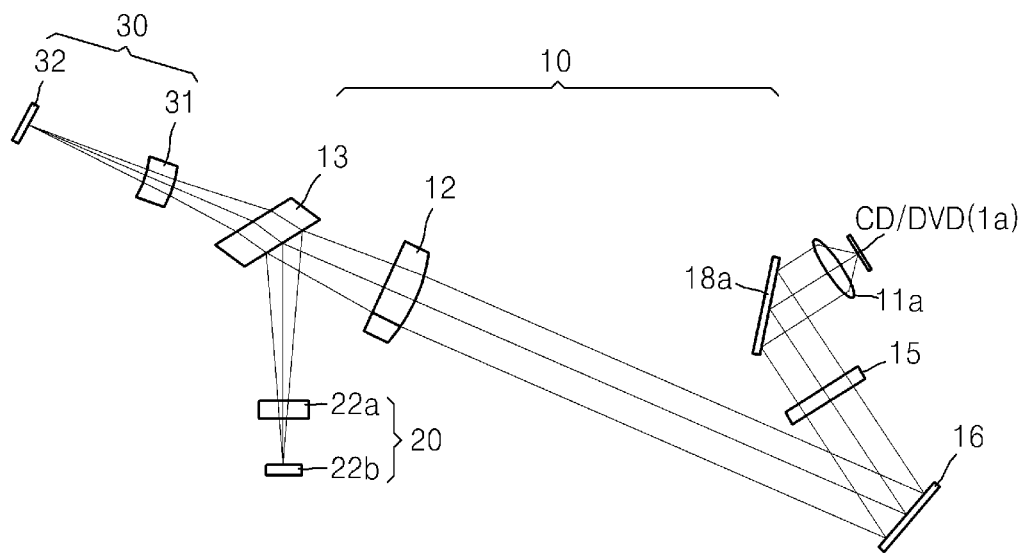
FIG. 1 is a diagram illustrating an optical pickup device for compact discs (CDs) or digital versatile discs (DVDs), according to an example embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Generally, an optical disc drive may include a spindle motor (not shown) to drive an optical disc and an optical pickup device that corresponds to a recording surface of the optical disc.

FIG. 1 is a diagram illustrating an optical pickup device for compact discs (CDs) or digital versatile discs (DVDs), according to an example embodiment.

The optical pickup device may include a light-transmitting system 10 that directly corresponds to a medium 1a such as, for example, a CD or a DVD, and a light source system 20 that provides a plurality of beams for reproducing information from and/or recording information on the medium 1a. The plurality of beams from the light source 20 may be, for example, three beams including a central main beam and first and second sub-beams on both sides of the central main beam.

The optical pickup device may also include a light-receiving system 30 that generates an electrical signal for processing a data signal or a tracking error signal (TES) by using a photodetector 32. The photodetector 32 may include a plurality of light-receiving cells to receive the beams reflected by the medium 1a. For example, the photodetector 32 may include three light-receiving cells to receive the three beams reflected by the medium 1a for reproducing information. The light source system 20 may include a light source 21a to transmit beams upon CDs or DVDs and a diffraction element 22a. A beam from the light source 21a passes through the diffraction element 22a and may be incident on a first beam splitter 13. The diffraction element 22a may diffract a single beam from the light source 21a into a main beam and ±first sub-beams.

The light-receiving system 30 includes the photodetector 32 that detects the three beams reflected by the medium 1a and passing through the first beam splitter 13 and generates an electrical signal. The light-receiving system 30 may also include a sensing lens 31 that focuses the main beam and the first and second sub-beams on both sides of the main beam with an appropriate intensity on the photodetector 32.

The light-transmitting system 10 may also include an objective lens 11a to correspond to the medium 1a, path changing minors 16 and 18a, a quarter wave plate (QWP) 15, and a collimating lens 12. The light-transmitting system 10 may also include the first beam splitter 13. The first beam splitter 13 reflects the three beams from the light source system 20 to the objective lens 11a, and transmits light reflected by the medium 1a therethrough to the light-receiving system 30.

Figure 2:
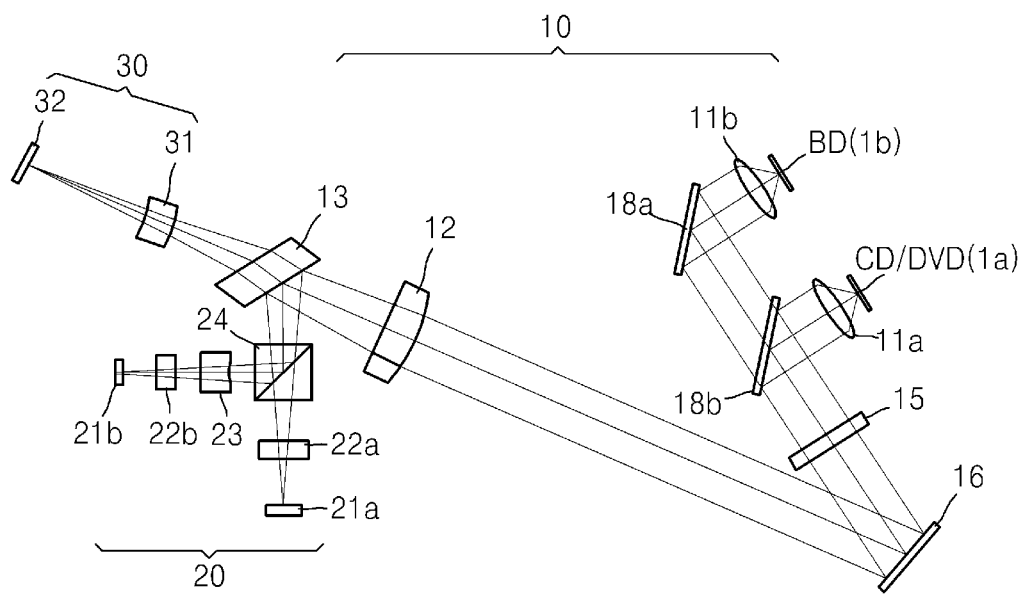
FIG. 2 is a diagram illustrating an optical pickup device for CDs, DVDs, or Blu-ray discs (BDs), according to another example embodiment.

FIG. 2 is a diagram illustrating an optical pickup device for CDs, DVDs, or Blu-ray discs (BDs), according to another example embodiment.

The optical pickup device may include a total reflection mirror 18b disposed under an objective lens 11b for BDs, and a dichroic mirror 18b that allows blue light to be transmitted therethrough disposed under an objective lens 11a for CDs or DVDs. The total reflection mirror 18a and the dichroic minor 18b may be optional elements and disposed on an optical progression path of light output from the optical path changing mirror 16. The optical path changing minor 16 may reflect light from the first beam splitter 13 to the dichroic mirror 18b. The optical path changing minor 16 may also reflect light from the medium 1a and 1b to the first beam splitter 13.

The light source system 20 according to an example embodiment may be explained as follows.

The light source system 20 may include a plurality of light sources to correspond to the medium 1a and 1b. The light sources may be, for example, a light source 21a for CDs or DVDs, and a light source 21b for BDs. Each of the light sources 21a and 21b may emit light to two incident surfaces of a second beam splitter 24 having a cubic structure. A coupling lens 23 may be provided in the light source system 20 to adjust an optical distance between the light source 21b for BDs and the medium 1b. The coupling lens 23 may adjust the optical distance between the light source 21b for BDs and the medium lb by adjusting an optical magnification, that is, the amount of light defocused. The coupling lens 23 may be disposed between the light source 21b for BDs and the second beam splitter 24. Light incident from the light sources 21a and 21b progresses through the second beam splitter 24 to the first beam splitter 13. A diffraction element 22b for BDs and the diffraction element 22a for CDs or DVDs for forming a main beam and ± first sub-beams may be disposed between the second beam splitter 24 and the light source 21a and between the second beam splitter 24 and the light source 21b, respectively. Generally, an interval between the main beam and the ±first sub-beams, for example, may vary according to an interval of gratings of the diffraction element.

Figure 3:
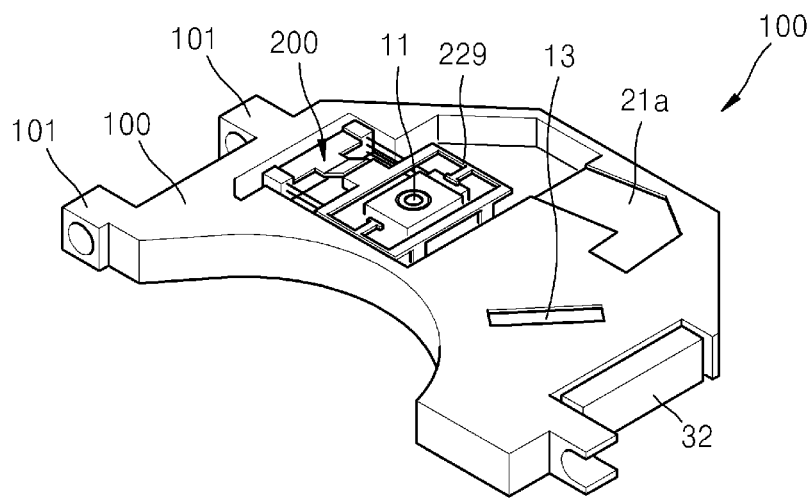
FIG. 3 is a diagram illustrating the optical pickup device of FIG. 1.

The optical pickup device according to an example embodiment as described above, which may be one assembly, may have a shape as shown in FIG. 3. FIG. 3 is a diagram illustrating the optical pickup device for CDs or DVDs of FIG. 1.

Referring to FIG. 3, an assembly base 100 having a predetermined thickness may include a space for containing a plurality of optical components. Generally, the assembly base 100 according to an example embodiment may be formed by using aluminum die casting or plastic molding.

The assembly base 100 may include an objective lens driving unit 200, having an objective lens 11 and a protective cover 229 that surrounds the objective lens 11. The optical components provided in the assembly base 100 may include, for example, the first beam splitter 13, the light source 21a, and the photodetector 32. The first beam splitter 13, the light source 21a, and the photodetector 32 may be fixedly inserted into the assembly base 100 and arranged as shown in FIG. 1. The assembly base 100 may also include a shaft guide portion 101 formed on a side of the assembly base 100. The shaft guide portion 101 may include a cylindrical hole into which a guide shaft (not shown) of an optical disc drive device may be inserted.

Figure 4:
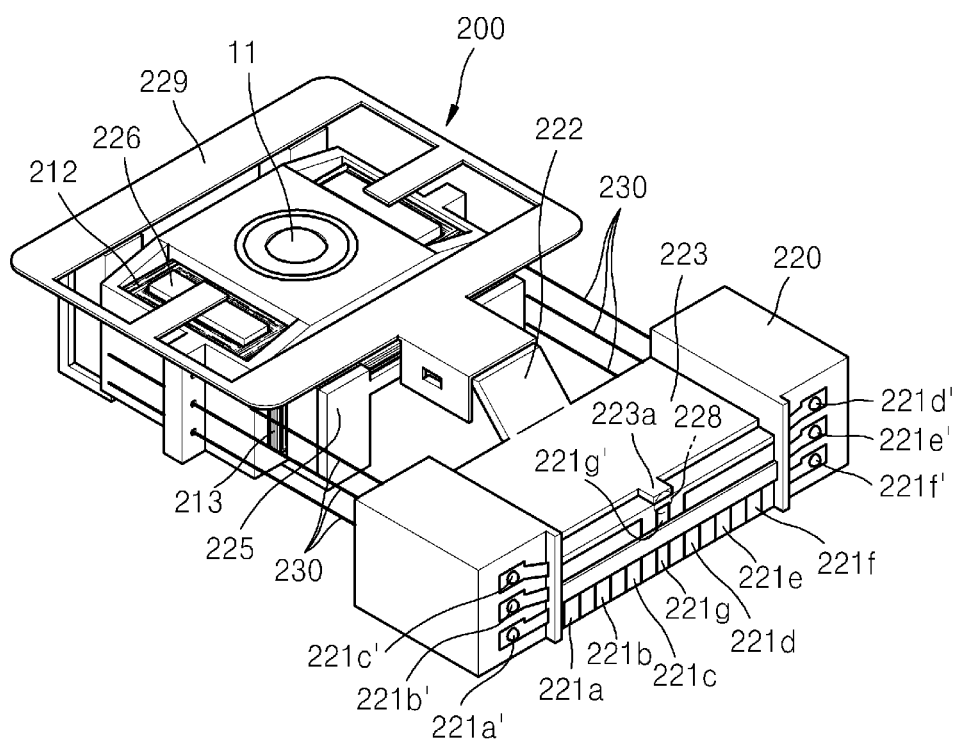
FIG. 4 is a diagram illustrating an objective lens driving unit used in the optical pickup device of FIG. 1.
Figure 5:
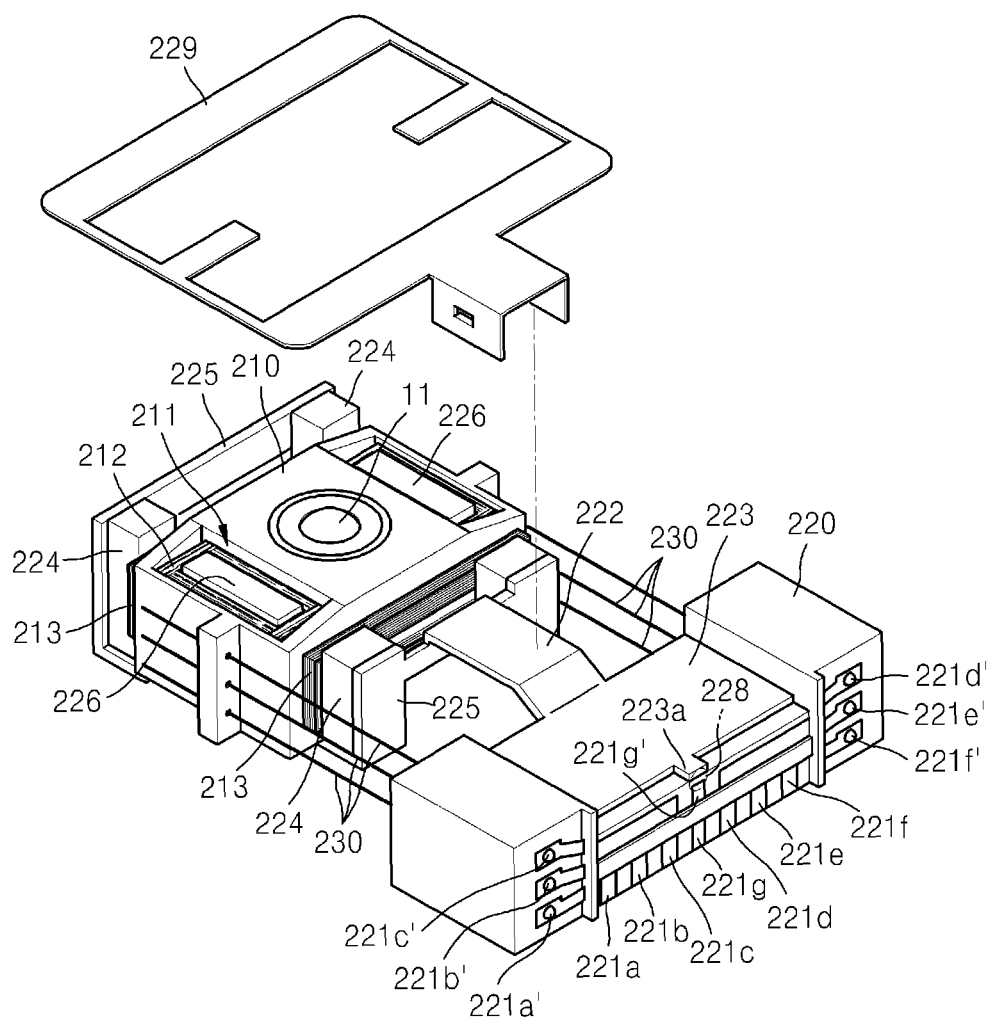
FIG. 5 is a diagram illustrating a protective cover separated from the objective lens driving unit of FIG. 4.

FIGS. 4 and 5 are diagrams illustrating the objective lens driving unit 200 used in the optical pickup device of FIGS. 1 and 3.

Referring to FIGS. 4 and 5, the objective lens 11 may be provided at a center of a top surface of a frame 210 of a moving structure having a quadrangular shape. The objective lens 11 may be surrounded by a protective cover 229. Through-holes 211 having quadrangular shapes may be formed at both sides of the top surface of the frame 210. A first driving coil 212 for focusing of the objective lens 11 may be embedded in each of the through-holes 211 formed at both sides of the top surface of the frame 210. A second driving coil 213 for tracking may be attached to an outer surface of the through-holes 211 formed at both sides of a side portion of the frame 210.

According to an example embodiment, a static structure may include a permanent magnet 224 and a yoke structure. The yoke structure may include a peripheral yoke 225 configured to move and face the second driving coil 213, and a center yoke 226 located at a center of the through-hole 211. The permanent magnet 224 may be fixed to an inner surface of the peripheral yoke 225 and configured to face the second driving coil 213.

The objective lens driving unit 200 may include a fixed portion 223 fixed to a top surface of a wire holder 220, and a connection portion 222 disposed between the yoke structure and the fixed portion 223. The fixed portion 223 and the connection portion 222 may be formed on one end of the yoke structure. One end portion of the protective cover 229 may be coupled to the connection portion 222. As such, the protective cover 229, the peripheral yoke 225, and the center yoke 226 may be electrically connected to each other and grounded through a ground wiring layer 221g that will be explained below.

The static structure, including the wire holder 220, the peripheral yoke 225, the center yoke 226, and the permanent magnet 224, may be configured to support the frame 210 of the moving structure by using suspension wires 230.

Figure 6:
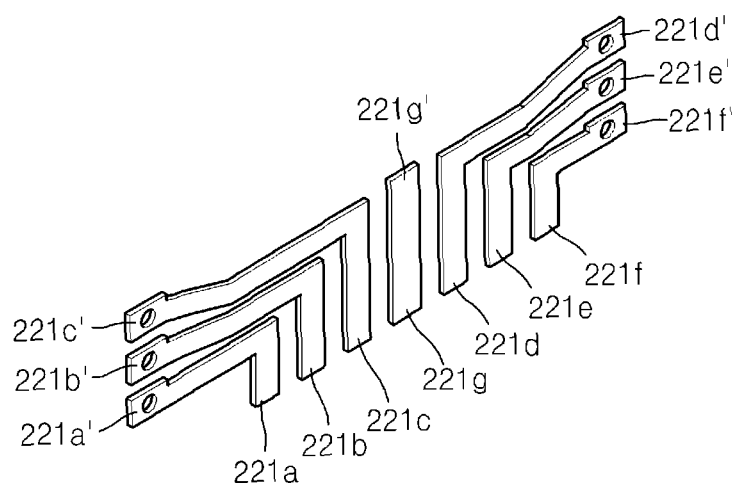
FIG. 6 is a diagram illustrating a wiring layer buried in a wire holder of the objective lens driving unit of FIG. 4.

A plurality of wiring layers 221a through 221g for supplying electrical signals to the first and second driving coils 212 and 213 may be fixedly buried in a rear surface of the wire holder 220. Structures of the wiring layers 221a through 221g according to an example embodiment may be shown in FIG. 6. The wire holder 220 may be configured with the rear surface of the wire holder 220 adjacent to the top surface of the wire holder 220. The wire holder 220 having the wiring layers 221a through 221g buried in the rear surface of the wire holder 220, according to an example embodiment, may be shown in FIG. 7. The wire holder 220 having the wiring layers 221a through 221g buried in the rear surface of the wire holder 220 may be manufactured by using injection molding. The wiring layers 221a through 221g may be inserted, for example, into given positions of a mold.

Figure 7:
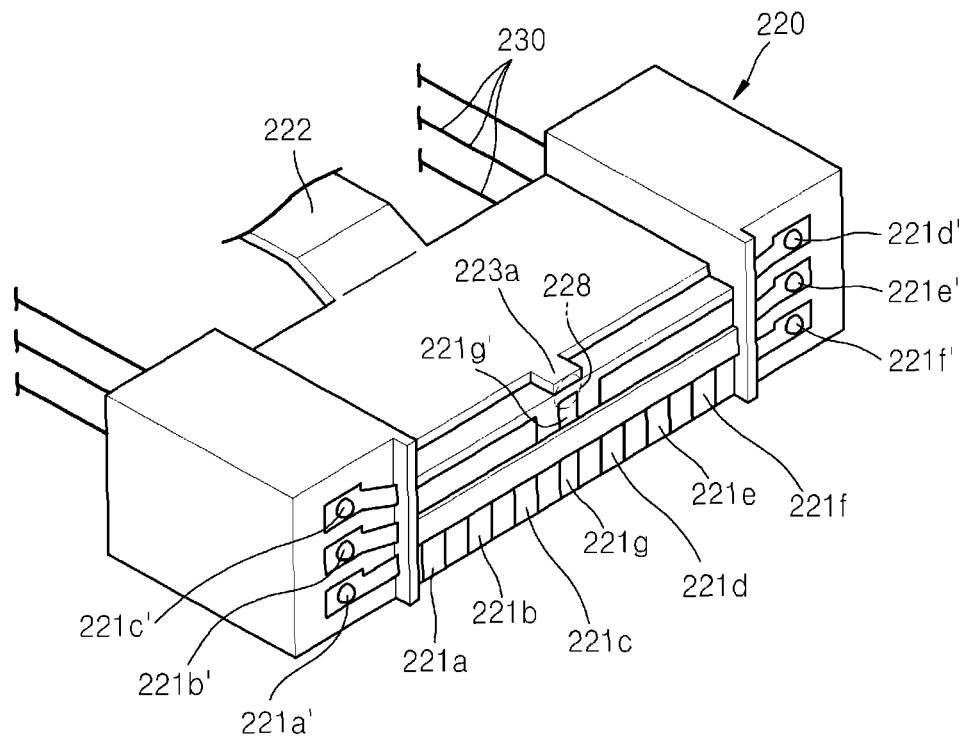
FIG. 7 is a diagram illustrating a wire holder of the objective lens driving unit of FIG. 4.

As shown in FIGS. 4 and 7, rear end portions of the suspension wires 230 passing through both sides of the wire holder 220 may be fixed to terminals 221a' through 221f' of the wiring layers 221a through 221f. The terminals 221a' through 221f' may be arranged on lateral edge portions of the rear surface of the wire holder 220. Other terminals of the wiring layers 221a through 221g, aligned on a lower portion of the rear surface of the wire holder 220, may be connected to an external circuit.

Any one of the wiring layers 221a through 221g may be a ground wiring layer. As shown in FIG. 7, for example, the wiring layer 221g may be the ground wiring layer. As such, an upper terminal 221g' of the ground wiring layer 221g may be disposed adjacent to a projection 223a projecting from an edge of the fixed portion 223. The upper terminal 221g' may be connected to the projection 223a by soldering 228. Accordingly, the protective cover 229 and the peripheral yoke 225 may be connected to a ground portion of the external circuit, so that a circuit of the optical pickup device may be protected from external electrical impact such as electrostatic discharge (ESD).

Figure 8:
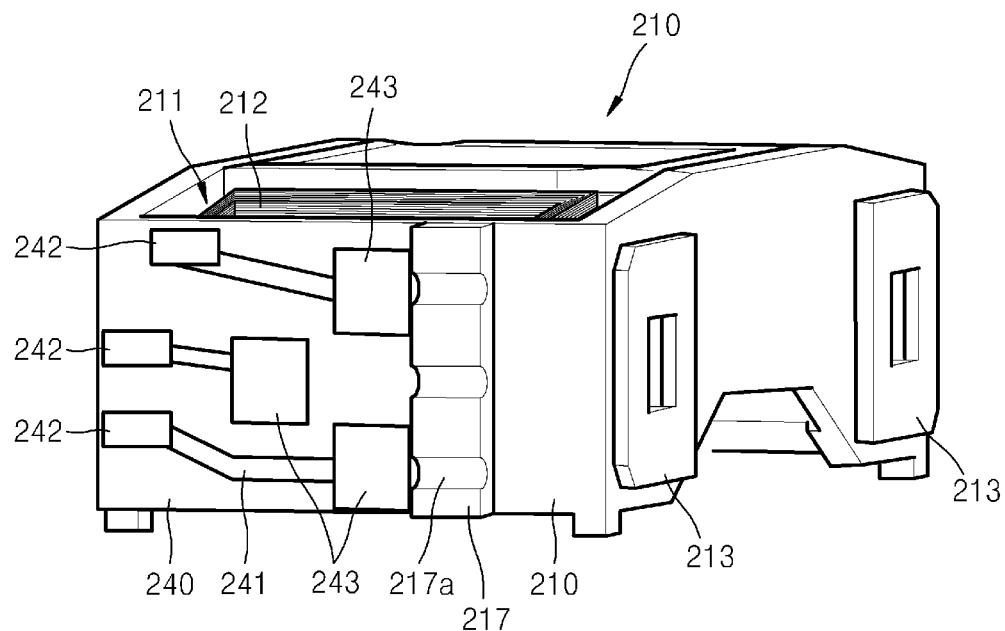
FIG. 8 is a diagram illustrating a frame of a moving structure of the objective lens driving unit of FIG. 4.

FIG. 8 is a diagram illustrating the frame 210 that supports the moving structure of objective lens driving unit 200.

As shown in FIG. 8, front end portions of the suspension wires 230 fixed to side surfaces of the frame 210 may be electrically connected to the first driving coil 212. According to an example embodiment, a circuit board 240 to fix the suspension wires 230 may be attached to the side surfaces of the frame 210. A bridge 217 integrally formed with the frame 210 may be positioned on a side of the circuit board 240. The bridge 217 may include grooves 217a to support the suspension wires 230 of which the front end portions of the suspension wires 230 may be fixed by using, for example, soldering or the like to the circuit board 240.

The circuit board 240 and the second driving coil 213 which faces the permanent magnet 224 may be positioned on a side surface of the frame 210, and the first driving coil 212 may be provided in the through-hole 211.

Figure 9:
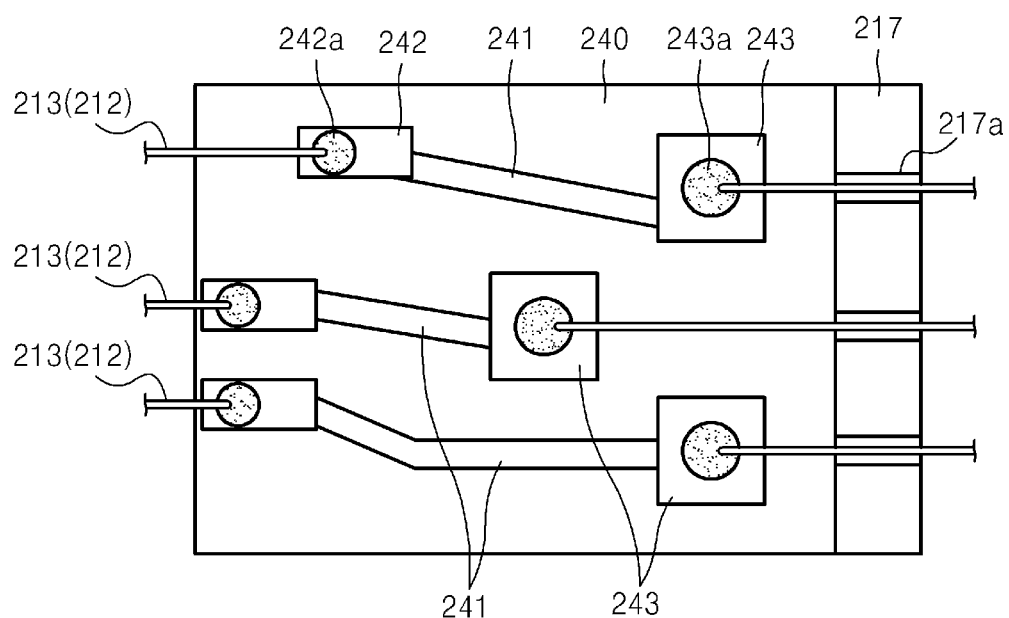
FIG. 9 is a diagram illustrating a static structure including driving coils and suspension wires of the objective lens driving unit of FIG. 4.

FIG. 9 is a diagram illustrating the first and second driving coils 212 and 213 and the suspension wires 230 attached to the circuit board 240.

As shown in FIGS. 8 and 9, end portions of the first and second driving coils 212 and 213 may be joined by using soldering 242a or the like to first terminals 242 of wiring layers 241. End portions of the suspension wires 230 may be joined to second terminals 243 of the wiring layers 241 by using soldering 243a. Accordingly, the suspension wires 230 and the first and second driving coils 212 and 213 corresponding to the suspension wires 230 may be electrically connected through the terminals 242 and 243 of the wiring layers 241.

As described above, in an optical pickup device and an optical disc drive using the same according to an example embodiment, since a wiring layer may be configured to be buried in a wire holder, manufacturing processes may be simple and manufacturing costs may be small compared to a conventional structure in which a circuit board may be attached as an additional member to a rear surface of a wire holder. That is, according to an example embodiment, since the wiring layer and the wire holder may be configured to be integrated as one body, a process for separately assembling the wiring layer and the wire holder may not be required. Moreover, the wiring layer and the wire holder may be managed, for example, as one body in a production line. Accordingly, according to an aspect, manufacturing costs may be smaller than those in the conventional structure.

According to an example embodiment, the connection portion and the ground wiring layer may be easily joined by using soldering or the like since a connection portion connected to a yoke structure may be disposed adjacent to a ground wiring layer.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An objective lens driving unit comprising:
   a moving structure that comprises an objective lens and a plurality of driving coils;
   a magnet and a yoke structure which correspond to the driving coils;
   a wire holder that is coupled to the yoke structure and having a plurality of wiring layers formed in a first side surface from among a plurality of side surfaces of the wire holder; and
   a plurality of suspension wires passing through the wire holder and connecting the plurality of driving coils to the plurality of wiring layers,
   wherein the wire holder is formed of a single uniform structure.

2. The objective lens driving unit of claim 1, wherein a ground wiring layer is included in the plurality of wiring layers.

3. The objective lens driving unit of claim 1, further comprising a protective cover to protect the moving structure and electrically connected to the ground wiring layer.

4. The objective lens driving unit of claim 3, further comprising a fixed portion fixed to the wire holder and disposed on a side of the yoke structure.

5. The objective lens driving unit of claim 4, further comprising a connection portion disposed between the yoke structure and the fixed portion,
   wherein a side of the protective cover is fixed to the connection portion.

6. The objective lens driving unit of claim 4, wherein the fixed portion is fixed to a second surface of the wire holder adjacent to the first surface of the wire holder.

7. The objective lens driving unit of claim 1, wherein the ground wiring layer is located at a center of the first surface of the wire holder and the other wiring layers among the plurality of wiring layers are located on both sides of the ground wiring layer.

8. An optical pickup device comprising:
   a moving structure that comprises an objective lens and a plurality of driving coils;
   a static structure that comprises a permanent magnet and a yoke structure to correspond to the plurality of driving coils, a wire holder attached to the yoke structure and having a plurality of wiring layers comprising a ground wiring layer buried in a first surface from among a plurality of surfaces of the wire holder, and a plurality of suspension wires connecting the plurality of driving coils to the plurality of wiring layers; and
   a base to support the static structure and comprising a light source and a photodetector disposed therein.

9. The optical pickup device of claim 8, further comprising a protective cover to protect the moving structure and electrically connected to the ground wiring layer.

10. The optical pickup device of claim 9, further comprising a fixed portion fixed to the wire holder and disposed on a side of the yoke structure.

11. The optical pickup device of claim 10, further comprising a connection portion disposed between the yoke structure and the fixed portion,
    wherein a side of the protective cover is fixed to the connection portion.

12. The optical pickup device of claim 11, wherein the fixed portion is fixed to a second surface of the wire holder adjacent to the first surface of the wire holder,
    wherein the fixed portion fixed to the second surface is electrically connected to the ground wiring layer through an edge portion between the first surface and the second surface.

13. The optical pickup device of claim 8, wherein the ground wiring layer is located at a center of the first surface of the wire holder and the other wiring layers among the plurality of wiring layers are located on both sides of the ground wiring layer.

14. An optical disc drive comprising:
    a spindle motor to drive an optical disc; and
    an optical pickup device to correspond to a recording surface of the optical disc,
    wherein the optical pickup device comprises:
       a moving structure that comprises an objective lens and a plurality of driving coils;
       a static structure that comprises a permanent magnet and a yoke structure to correspond to the plurality of driving coils, a wire holder attached to the yoke structure and having a plurality of wiring layers comprising a ground wiring layer buried in a first surface from among a plurality of surfaces of the wire holder, and a plurality of suspension wires connecting the plurality of driving coils to the plurality of wiring layers; and
       a base to support the static structure and comprising a light source and a photodetector disposed therein.

15. The optical disc drive of claim 14, wherein the ground wiring layer is located at a center of the first surface of the wire holder and the other wiring layers among the plurality of wiring layers are located on both sides of the ground wiring layer.

16. An objective lens driving unit comprising:
    a first structure including an objective lens and a plurality of driving coils;
    a second structure including a permanent magnet and a yoke structure to correspond to the driving coils;
    a wire holder coupled to the yoke structure and having a plurality of wiring layers formed in a portion of the wire holder; and
    a plurality of suspension wires passing through the wire holder and connecting the plurality of driving coils to the plurality of wiring layers,
    wherein the wire holder is formed of a single uniform structure.

17. An optical apparatus comprising:
a housing assembly comprising an optical pickup device including an objective lens driving unit used in the optical pickup device, the objective lens driving unit comprising:
- a first structure including an objective lens and a plurality of driving coils;
- a second structure including a magnet and a yoke structure corresponding to the driving coils;
- a wire holder coupled to the yoke structure and having a plurality of wiring layers formed in a portion of the wire holder; and
- a plurality of suspension wires passing through the wire holder and connecting the plurality of driving coils to the plurality of wiring layers, wherein the wire holder is formed of a single uniform structure.

18. The optical apparatus of claim 17, wherein the housing assembly includes a plurality of beam splitters, a plurality of light sources, and a photodetector.

19. The optical apparatus of claim 17, wherein the plurality of wiring layers are integrally formed to a rear surface of the wire holder.

20. The objective lens driving unit of claim 1, further comprising:
- a fixed portion fixed to the wire holder and disposed on a side of the yoke structure; and
- a connection portion disposed between the yoke structure and the fixed portion.

* * * * *